(12) United States Patent
Chen (10) Patent No.: US 9,001,500 B2
(45) Date of Patent: Apr. 7, 2015

(54) SLIDING MECHANISM AND ELECTRONIC DEVICE USING SAME

(71) Applicant: Zhou Chen, Shenzhen (CN)

(72) Inventor: Zhou Chen, Shenzhen (CN)

(73) Assignees: Fu Tai Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 169 days.

(21) Appl. No.: 13/631,886

(22) Filed: Sep. 29, 2012

(65) Prior Publication Data

US 2013/0155584 A1    Jun. 20, 2013

(30) Foreign Application Priority Data

Dec. 16, 2011  (CN) .......................... 2011 1 0422959

(51) Int. Cl.
*H05K 5/00* (2006.01)
*H05K 7/00* (2006.01)
*G06F 1/16* (2006.01)
*H04M 1/02* (2006.01)

(52) U.S. Cl.
CPC .......... *G06F 1/1624* (2013.01); *H04M 1/0237* (2013.01)

(58) Field of Classification Search
CPC ........................... H04M 1/0237; G06F 1/1624
USPC ............... 361/679.01; 455/575.1, 575.4
See application file for complete search history.

(56) References Cited

U.S. PATENT DOCUMENTS

| | | | | |
|---|---|---|---|---|
| 7,376,450 B2* | 5/2008 | Chen | .......................... | 455/575.4 |
| 7,496,389 B2* | 2/2009 | Cho et al. | .................. | 455/575.4 |
| 7,953,463 B2* | 5/2011 | Misawa | ...................... | 455/575.1 |
| 8,466,876 B2* | 6/2013 | Kwak et al. | .................. | 345/168 |
| 8,564,936 B2* | 10/2013 | Ejima | ...................... | 361/679.01 |
| 8,593,801 B2* | 11/2013 | Minowa | ...................... | 361/679.3 |
| 8,594,752 B2* | 11/2013 | Kim et al. | .................. | 455/575.3 |
| 8,660,622 B2* | 2/2014 | Holman et al. | ............ | 455/575.4 |
| 8,693,188 B2* | 4/2014 | Holman et al. | .......... | 361/679.56 |
| 2005/0137001 A1* | 6/2005 | Bell et al. | .................... | 455/575.4 |
| 2008/0004083 A1* | 1/2008 | Ohki et al. | .................... | 455/566 |
| 2010/0197372 A1* | 8/2010 | Takagi et al. | .............. | 455/575.4 |
| 2010/0248798 A1* | 9/2010 | Ishikawa et al. | ........... | 455/575.4 |
| 2011/0143818 A1* | 6/2011 | Makino et al. | ................ | 455/566 |
| 2011/0237313 A1* | 9/2011 | Takita et al. | ............... | 455/575.4 |
| 2012/0231859 A1* | 9/2012 | Makino et al. | ............. | 455/575.4 |
| 2012/0238333 A1* | 9/2012 | Mori et al. | ................. | 455/575.4 |
| 2012/0238334 A1* | 9/2012 | Murayama et al. | ........ | 455/575.4 |
| 2012/0295666 A1* | 11/2012 | Sakurai et al. | ................ | 455/566 |
| 2013/0148276 A1* | 6/2013 | Yu | ............................ | 361/679.01 |

* cited by examiner

*Primary Examiner* — Lisa Lea Edmonds
*Assistant Examiner* — Keith Depew
(74) *Attorney, Agent, or Firm* — Novak Druce Connolly Bove + Quigg LLP (57) ABSTRACT

A sliding mechanism is for sliding a cover relative to a body of an electronic device to close and open the electronic device. The sliding mechanism includes a driving assembly capable of sliding between a first position and a second position different from the first position, and an abutting assembly engaging with the driving assembly and capable of sliding between a closed position and an open position. When the driving assembly is driven to slide from the first position to the second position, the abutting assembly is driven to rotate from the closed position to the open position to open the electronic device. When the driving assembly slides back to the first position, the abutting assembly is driven to rotate from the open position to the closed position to close the electronic device. An electronic device using the sliding mechanism is also provided.

12 Claims, 5 Drawing Sheets

SLIDING MECHANISM AND ELECTRONIC DEVICE USING SAME

BACKGROUND

1. Technical Field

The present disclosure relates to electronic devices, and particularly to an electronic device with a sliding mechanism.

2. Description of Related Art

Electronic device, such as mobile phones, includes a body and a cover slidably coupled to the body. A display is mounted on the cover. The electronic device is opened by manually pushing the cover to slide relative to the body. However, when the cover is manually pushed, the display may be easily scraped.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
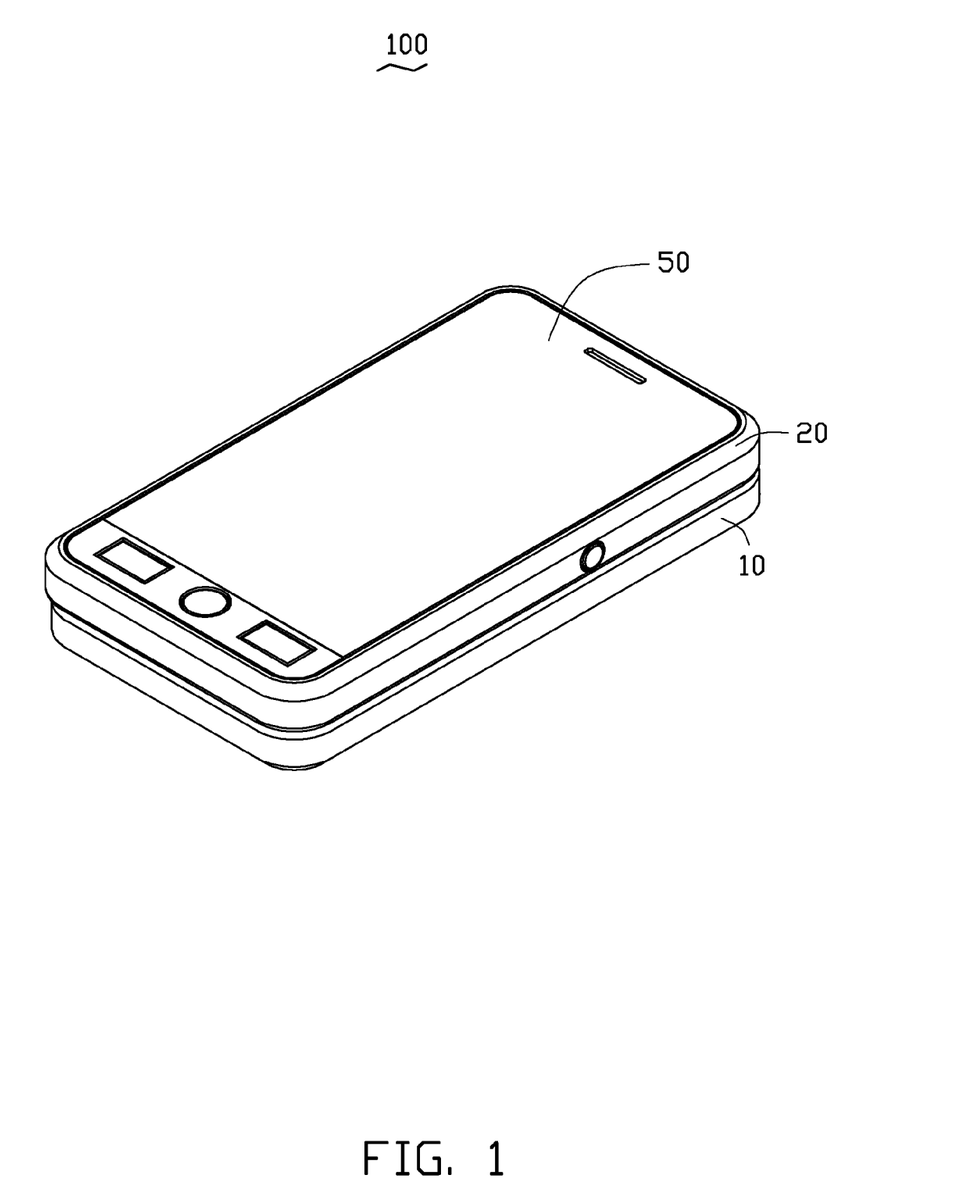
FIG. 1 is an isometric view of an electronic device in accordance with an embodiment.
Figure 2:
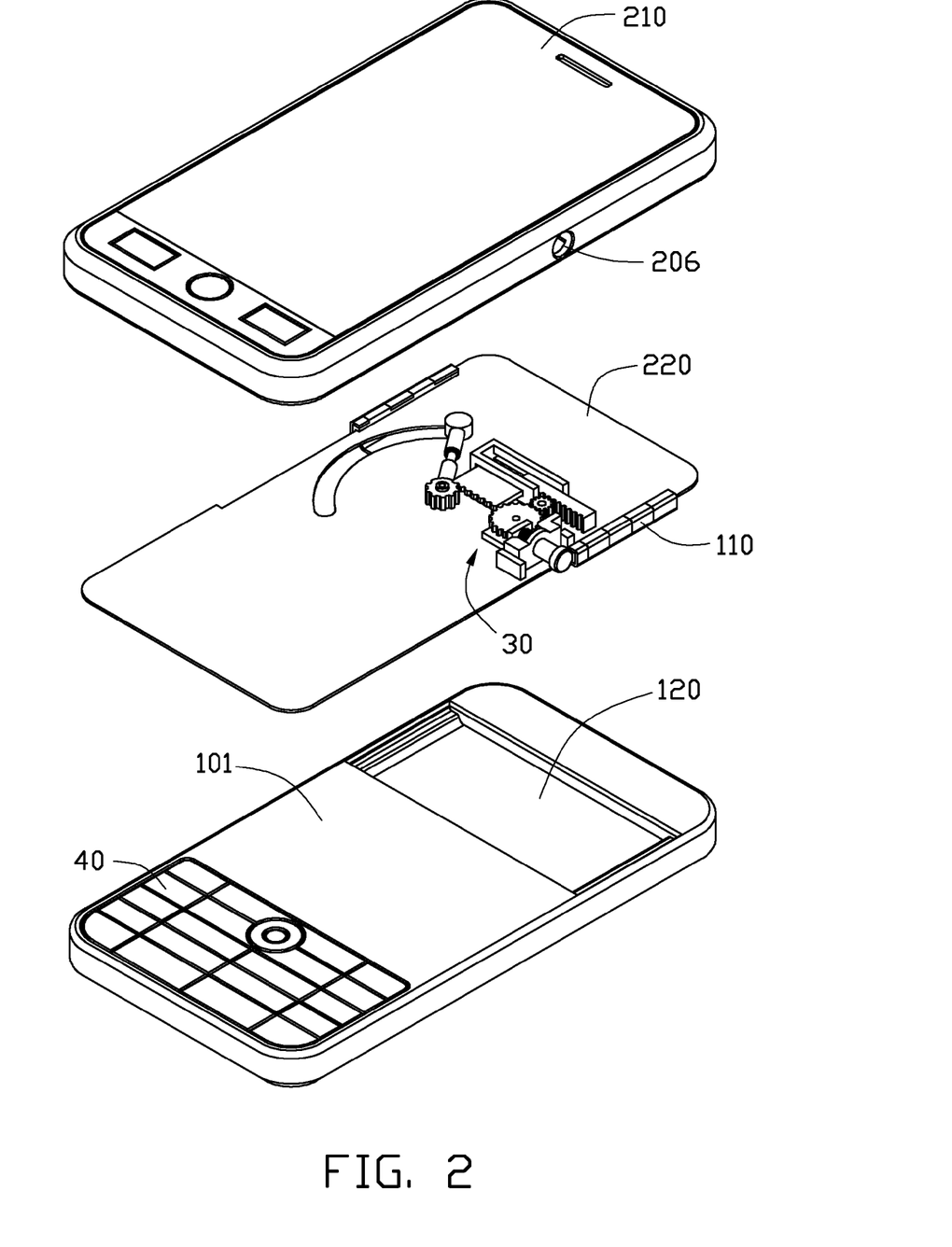
FIG. 2 is a partial disassembled view of the electronic device of FIG. 1; the electronic device includes a body, a cover and a sliding mechanism.

Referring to FIGS. 1 and 2, an electronic device 100 is shown. The electronic device 100 includes a body 10, a cover 20 slidably coupled to and covering the body 10, and a sliding mechanism 30 received in the cover 20. The electronic device 100 in the embodiment is a mobile phone. A keyboard 40 is mounted on a surface of the body 10 facing the cover 20. A display 50 is mounted on a surface of the cover 20 opposite to the body 10. The sliding mechanism 30 is adapted to drive the cover 20 to slide relative to the body 10, to open or close the electronic device 100. When the electronic device 100 is opened, the cover 20 covers the body 10 with the keyboard 40 hidden; when the electronic device 100 is closed, the cover 20 partially covers the body 10 with the keyboard 40 exposed.

The body 10 is substantially rectangular. The body 10 includes a top surface 101 for mounting the keyboard 40 and a sliding plate 110. An end of the top surface 101 away from the keyboard 40 defines a recess 120. The recess 120 is adapted to receive the sliding plate 110. The sliding plate 110 includes a base plate 112 and two sliding rails 114 (see FIG. 3). The sliding rails 114 are secured to opposite ends of the base plate 112. Each sliding rails 114 defines a sliding slot 116 extending in a direction parallel to the sliding direction of the cover 20 relative to the body 10. A protrusion 118 protrudes from the base plate 112. The protrusion 118 defines a positioning hole 119 extending in a direction perpendicular to the base plate 112.

The cover 20 is substantially rectangular, and includes a top plate 210 for mounting the display 50, a bottom plate 220 opposite to the top plate 210, and four sidewalls 230. The bottom plate 220 engages with the top plate 210 and the sidewalls 230 to define a receiving space (not shown) for receiving the sliding mechanism 30. One of the sidewalls 230 defines a through hole 206.

Figure 3:
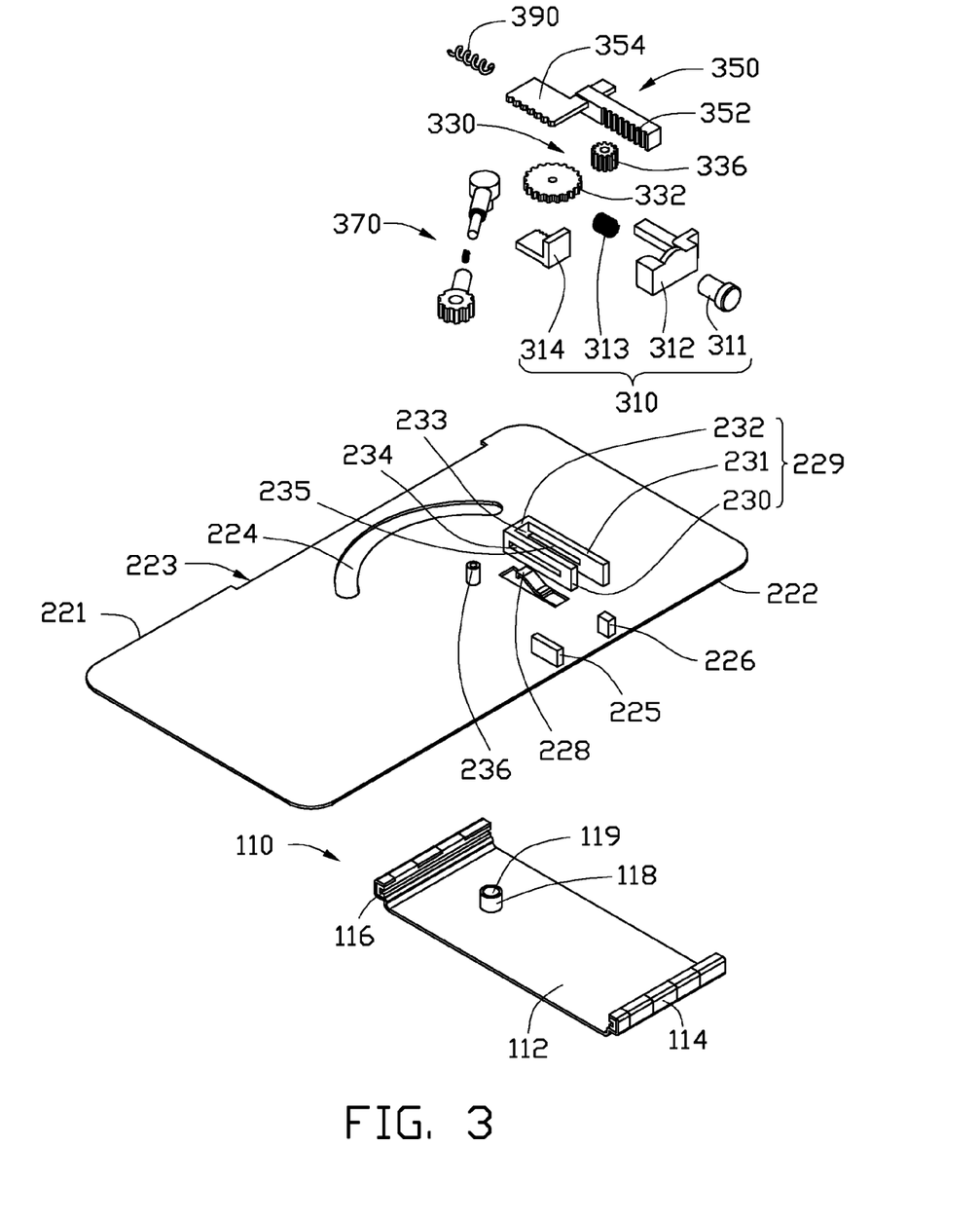
FIG. 3 is a disassembly view of a portion of the electronic device of FIG. 2.
Figure 4:
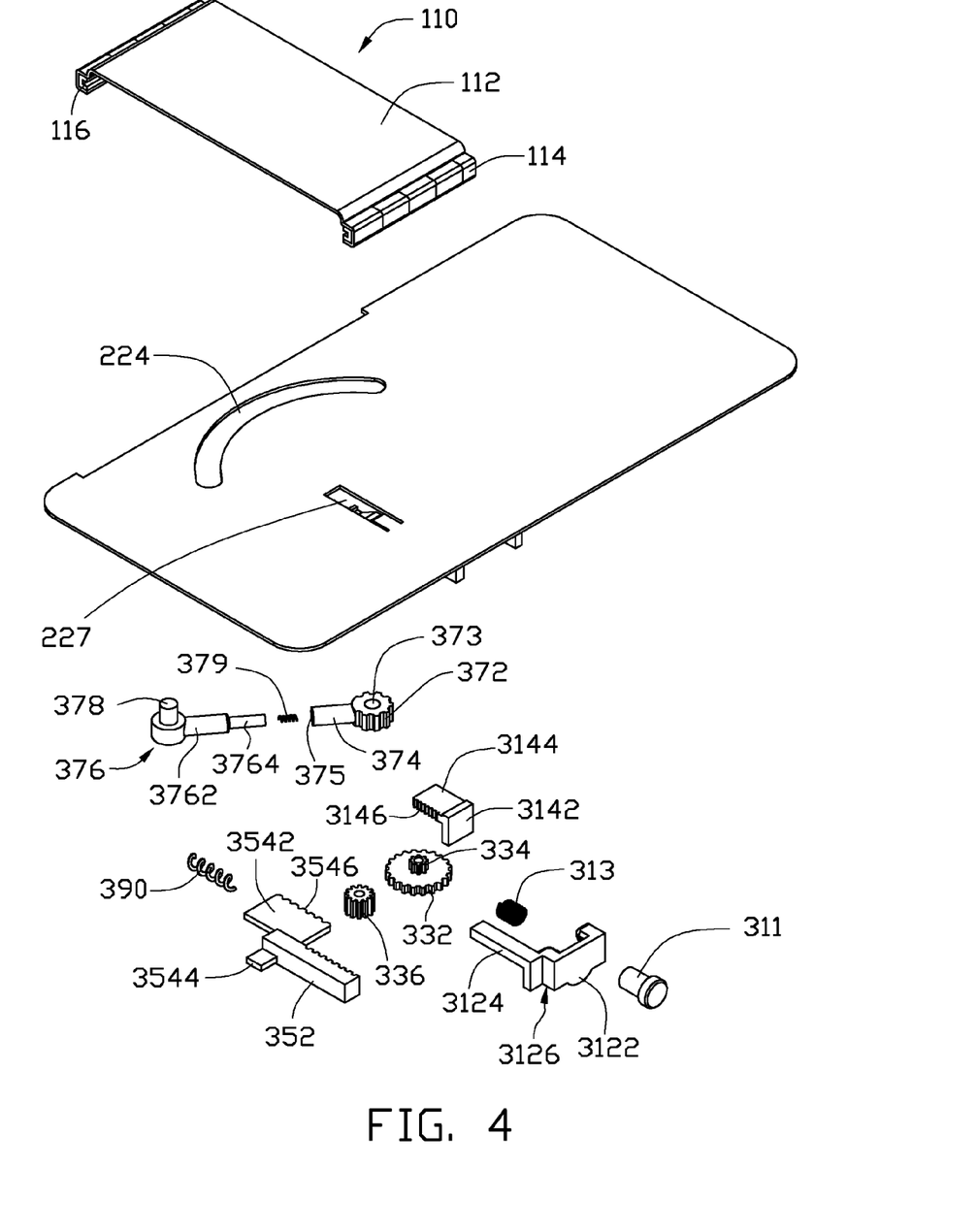
FIG. 4 is similar to FIG. 2, but viewed from another aspect.

Referring also to FIG. 3, the bottom plate 220 is slidably received in the sliding slots 116. The bottom plate 220 includes a first end portion 221 and a second end portion 222 opposite to and parallel to the first end portion 221. The first end portion 221 recesses toward the second end portion 222 to define a limiting portion 223. The limiting portion 223 is slidably received in and engages with of the sliding slot 116 to limit the sliding range of the sliding plate 110. The bottom plate 220 further defines a guiding slot 224 and an opening 227 (see FIG. 4). The guiding slot 224 is substantially arc-shaped and is adjacent to the limiting portion 223. The opening 227 is arranged between the guiding slot 224 and the second end portion 222. A stopper 228 is secured to an edge of the opening 227 adjacent to the second end portion 222. The stopper 228 is made of elastic material. The stopper 228 is capable of protruding out of a surface of the bottom plate 220 facing the display 50 when released, and is capable of retracting into the opening 227 when pressed. A guiding block 225 and a protruding block 226 are secured to the bottom plate 220. The guiding block 225 and the protruding block 226 are spaced apart from each other and are adjacent to the second end portion 222. The protruding block 226 and the stopper 228 are substantially perpendicularly aligned to the second end portion 222.

A positioning post 236 is secured to the bottom plate 220 and is between the guiding slot 224 and the second end portion 222. The positioning post 236 is substantially arranged at a center of the arc edge of the guiding slot 224. The positioning post 236 is equidistant to the guiding block 225 and the protruding block 226.

A limiting member 229 is secured to the bottom plate 220. The limiting member 229 is arranged at a side of the opening 227 opposite to the positioning post 236. The limiting member 229 includes a first limiting plate 230 perpendicular to the second end portion 222, a second limiting plate 231 parallel to and spaced from the first limiting plate 230, and a connecting plate 232. The first limiting plate 230 defines a first guiding slot 234 extending in a direction parallel to the opening 227. The second limiting plate 231 defines a second limiting slot 235 corresponding to the first limiting slot 234. The connecting plate 232 connects ends of the first and second limiting plates 230, 231 away from the second end portion 222 to cooperatively form a receiving portion 233.

The sliding mechanism 30 drives the cover 20 to slide relative to the body 10, to open or close the electronic device 100. The sliding mechanism 30 includes an operating assembly 310, a transmitting assembly 330, a driving assembly 350, an abutting assembly 370 and a first elastic member 390.

The operating assembly 310 is mounted on the bottom plate 220. The operating assembly 310 includes an operating portion 311, an actuating portion 312, a connecting portion 313 and a driving portion 314. The actuating portion 312 includes a base 3122 and an abutting arm 3124. The base 3122 is clasped between the guiding block 225 and the protruding block 226, to be limited to slide along the guiding block 225.

The abutting arm 3124 is secured to an end of the base 3122 adjacent to the protruding block 226, and cooperates with the base 3122 to form a notch 3126 for receiving the protruding block 226. The operating portion 311 abuts the middle of the base 3122 for receiving user operations. The connecting portion 313 is secured to a side of the base 3122 opposite to the operating portion 311. The connecting portion 313 in the embodiment is a spiral spring. The driving portion 314 is substantially L-shaped, and includes an abutting plate 3142 and a driving plate 3144 perpendicularly connected to an end of the abutting plate 3142. The abutting plate 3142 abuts an end of the connecting portion 3131 opposite to the base 3122. The driving plate 3144 is arranged parallel to the abutting arm 3124. An end of the driving plate 3144 facing the abutting arm 3124 defines a plurality of first teeth 3146.

The transmitting assembly 330 is rotatably secured to the bottom plate 220. The transmitting assembly 330 includes a first driving gear 332, a second driving gear 334, and a transmitting gear 336. The second driving gear 334 engages with the first teeth 3146. The first driving gear 332 is fixed to and coaxial with the second driving gear 334. The transmitting gear 336 engages with the first driving gear 332. In the embodiment, the diameter of the second driving gear 334 is less than the diameter of the first driving gear 332.

The driving assembly 350 includes a first toothed plate 352 and a second toothed plate 354 secured to the first toothed plate 352. The first toothed plate 352 is slidably received in the receiving portion 233 and engages with the transmitting gear 336. The second toothed plate 354 is substantially L-shaped, and includes a toothed portion 3542 defining a plurality of second teeth 3546 and a sliding arm 3544 extending from an end of the toothed portion 3542 opposite to the plurality of second teeth 3546. The middle portion of the sliding arm 3544 is perpendicularly secured to the first toothed plate 352, such that the first toothed plate 352 is spaced from the toothed portion 3542. Opposite ends of the sliding arm 3544 are slidably received in the first and second sliding slots 234, 235 respectively.

The abutting assembly 370 is telescopic and is rotatably secured to the bottom plate 220. The abutting assembly 370 includes a slave gear 372, a connecting post 374, a driving post 376 and a second elastic member 379. The slave gear 372 engages with the second teeth 3546 of the second toothed plate 354. The middle of the slave gear 372 defines a pivoting hole 373 for rotatably receiving the positioning post 236. The connecting post 374 is secured to the slave gear 372. An end of the connecting post 374 away from the slave gear 372 defines a receiving hole 375. The driving post 376 includes a first cylinder 3762 and a second cylinder 3764 secured to and coaxial with the first cylinder 3762. The diameter of the first cylinder 3762 is greater than the diameter of the receiving hole 375. The diameter of the second cylinder 3764 is less than the diameter of the receiving hole 375, such that the second cylinder 3764 is capable of being received in the receiving hole 375. A protruding post 378 is secured to an end of the first cylinder 3762 away from the second cylinder 3764. The protruding post 378 is capable of extending through the guiding slot 224 to be received in the positioning hole 119. The second elastic member 379 is received in the receiving hole 375 and abuts an end of the second cylinder 3764 away from the first cylinder 3762.

The first elastic member 390 is received in the receiving portion 233, with opposite ends abutting the connecting plate 232 and the sliding arm 3544. The first elastic member 390 provides an elastic force for driving the driving assembly 250 to slide to an end of the first and second limiting slots 234, 235 adjacent to the second end portion 222.

Figure 5:
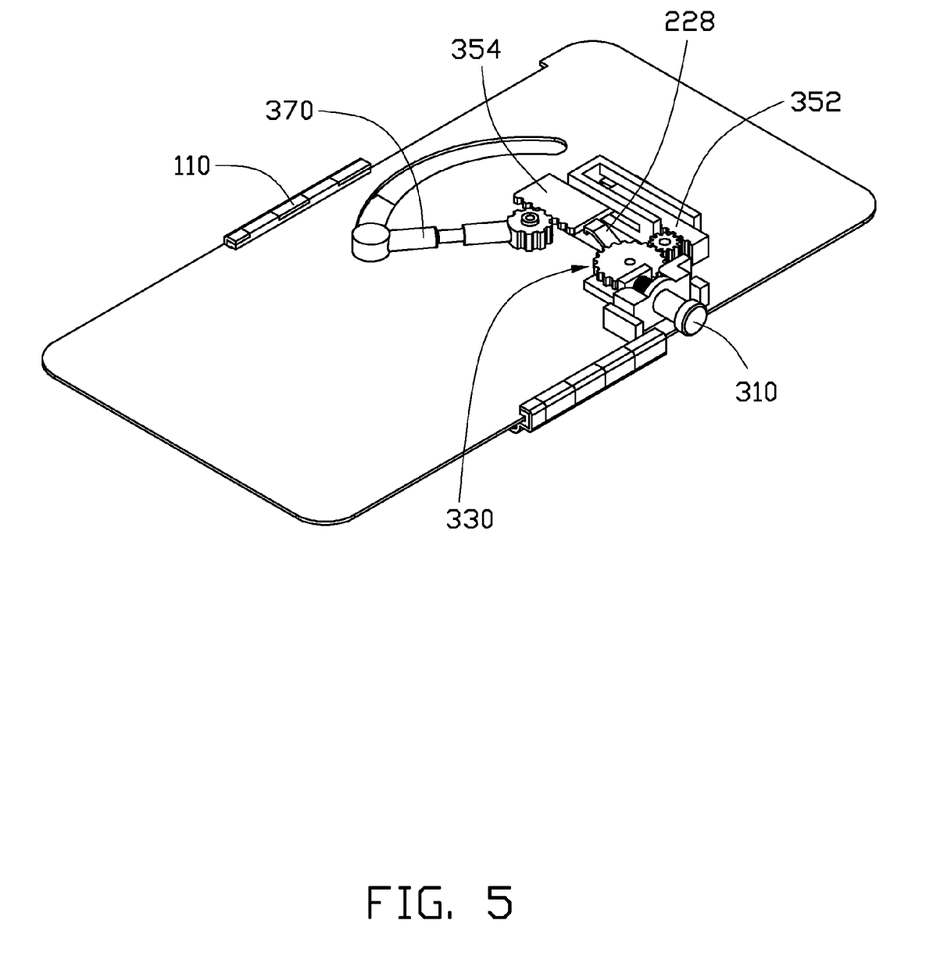
FIG. 5 is a perspective view of the sliding mechanism of FIG. 2 when the electronic device of FIG. 1 being in a closed state.

Referring to FIGS. 2 and 5, in assembly, first, the sliding mechanism 30 is secured to the bottom plate 220: the second elastic member 379 and the second cylinder 3764 are received in the receiving hole 375 in order, the protruding post 378 extends through the guiding slot 224, and the slave gear 372 is rotatably secured to the positioning post 236. The first elastic member 390 is received in the receiving portion 233, the second toothed plate 354 engages with the slave gear 372 with the sliding arm 3544 being slidably received in the first and second limiting slots 234, 235, the first toothed plate 352 is fixed to the middle of the sliding arm 3544 and is received in the receiving portion 233. The transmitting gear 336 engages with the first toothed plate 352, and the first driving gear 332 engages with the transmitting gear 336. The driving portion 314 engages with the second riving gear 334, the actuating portion 312 is clasped between the guiding block 225 and the protruding block 226, and the second elastic member 313 is arranged between the abutting plate 3142 and the base plate 3122. Second, the limiting portion 223 and the second end portion 222 are respectively received in the sliding slot 116, and the bottom plate 220 is further mounted to the sidewalls 230. Then, the sliding plate 110 is mounted to the body 10 with the protruding post 378 being received in the positioning hole 119. Finally, the operating portion 311 is received in the through hole 206 and abuts the base plate 3122.

Referring to FIG. 1, after assembly, when the electronic device 100 is in the closed state, the cover 20 covers the body 10 with the keyboard 50 hidden. The driving assembly 350 is driven by the first elastic member 390 to slide to an end of the first and second limiting slots 234, 235 adjacent to the second end portion 222 (hereinafter, a first position), and the protruding post 378 slides to an end of the guiding slot 224 adjacent to the limiting member 229 (hereinafter, a closed position). At this time, the stopper 228 is depressed by the second toothed plate 354 and is retracted in the opening 227.

Referring to FIG. 5, to open the electronic device 100, the operating portion 311 is pressed, the actuating portion 312 and the driving portion 314 are driven to slide toward the guiding slot 224, the transmitting assembly 330 is rotated, and the diving assembly 350 is driven to slide adjacent to the guiding slot 224 to deform the first elastic member 390. As a result, the slave gear 372 is rotated, the protruding post 378 is driven to slide to an end of the guiding slot 224 away from the closed position (hereinafter, the open position), and the cover 20 is driven to slide relative to the body 10 to open the electronic device 100. At the same time, when the sliding arm 3544 of the second toothed plate 354 slides to ends of the first and second limiting slots 234, 235 away from the second end portion 222 (hereinafter, the second position), the second toothed plate 354 releases the stopper 228, and the stopper 228 protrudes out of the bottom plate 220 to resist the second toothed plate 354, to prevent the driving assembly 350 from moving from the second position to the first position, and the electronic device 100 retains in the opened state.

Referring again to FIG. 2, to close the electronic device 100, the operating portion 311 is further pressed to drive the abutting arm 3124 to depress the stopper 228 to be retracted into the opening 227, the driving assembly 350 is released and is driven by the first elastic member 390 to slide from the second position to the first position, with the second toothed plate 354 pressing the stopper 228 again, and the protruding post 378 is driven to slide from the opened position to the closed position. As a result, the cover 20 slides to cover the body 10 and the electronic device 100 is closed.

By virtue of the sliding mechanism 30, the electronic device 100 can be opened or closed by pressing the operating portion 311, and the display 50 is prevented from being scraped.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
    a body;
    a cover slidably coupled to the body; and
    a sliding mechanism for driving the cover to slide relative to the body to open and close the electronic device, the sliding mechanism comprising:
    a driving assembly capable of sliding between a first position and a second position different from the first position; and
    an abutting assembly engaging with the driving assembly and capable of sliding between a closed position and an open position;
    an operating assembly received in the cover and configured for driving the driving assembly slide from the first position to the second position, the operating assembly comprising an operation portion configured for being pressed along a direction different from a sliding direction between the cover and the body;
    wherein after the operating portion is pressed, the driving assembly is driven to slide from the first position to the second position, the abutting assembly is driven to rotate from the closed position to the open position to open the electronic device with the cover partially covering the body; when the operating portion is pressed again, the driving assembly slides back to the first position, the abutting assembly is driven to rotate from the open position to the closed position to close the electronic device with the cover covering the body.

2. The electronic device of claim 1, wherein the operating assembly comprises a driving portion for driving the driving assembly to slide from the first position to the second position.

3. The electronic device of claim 2, wherein the sliding mechanism further comprises a first elastic member, wherein the first elastic member provides an elastic force for driving the driving assembly to slide from the second position to the first position when the driving assembly is released.

4. The electronic device of claim 3, wherein the cover comprises a stopper, the stopper is capable of abutting the driving assembly to retain the driving assembly in the second position, and is capable of being deformed to allow the driving assembly to slide from the second position to the first position.

5. The electronic device of claim 4, wherein the operating assembly further comprises an abutting portion for deforming the stopper to allow the driving assembly to slide from the second position to the first position.

6. The electronic device of claim 5, wherein the operating assembly further comprises a connecting portion for elastically connecting the abutting portion and the driving portion.

7. The electronic device of claim 2, wherein the sliding mechanism further comprises a transmitting assembly for driving the driving assembly to slide when the operating assembly is operated, the transmitting assembly comprising a transmitting gear engaging with the driving assembly, a first driving gear engaging with the transmitting gear, and a second driving gear fixed to the first driving gear and engaging with the operating assembly.

8. The electronic device of claim 1, wherein the abutting assembly abuts the body and is used to slide the cover relative to the body when rotated.

9. The electronic device of claim 8, wherein the abutting assembly is telescopic and comprises a slave gear engaging with the driving assembly.

10. The electronic device of claim 1, wherein a keyboard is mounted on a surface of the body facing the cover, the keyboard is hidden when the electronic device is closed, and is exposed when the electronic device is opened.

11. An electronic device, comprising:
    a body;
    a cover slidably coupled to the body; and
    a sliding mechanism for driving the cover to slide relative to the body to open and close the electronic device, the sliding mechanism comprising:
    a driving assembly capable of sliding between a first position and a second position different from the first position; and
    an abutting assembly engaging with the driving assembly and capable of sliding between a closed position and an open position;
    an operating assembly, the operating assembly comprises a driving portion for driving the driving assembly to slide from the first position to the second position; and
    a transmitting assembly for driving the driving assembly to slide when the operating assembly is operated, the transmitting assembly comprising a transmitting gear engaging with the driving assembly, a first driving gear engaging with the transmitting gear, and a second driving gear fixed to the first driving gear and engaging with the operating assembly;
    wherein when the driving assembly is driven to slide from the first position to the second position, the abutting assembly is driven to rotate from the closed position to the open position to open the electronic device with the cover partially covering the body; when the driving assembly slides back to the first position, the abutting assembly is driven to rotate from the open position to the closed position to close the electronic device with the cover covering the body.

12. An electronic device, comprising:
    a body;
    a cover slidably coupled to the body; and
    a sliding mechanism for driving the cover to slide relative to the body to open and close the electronic device, the sliding mechanism comprising:
    a driving assembly capable of sliding between a first position and a second position different from the first position; and
    an abutting assembly engaging with the driving assembly and capable of sliding between a closed position and an open position, wherein the abutting assembly is telescopic and comprises a slave gear engaging with the driving assembly, and the abutting assembly abuts the body and is used to slide the cover relative to the body when rotated;
    wherein when the driving assembly is driven to slide from the first position to the second position, the abutting assembly is driven to rotate from the closed position to the open position to open the electronic device with the cover partially covering the body; when the driving assembly slides back to the first position, the abutting assembly is driven to rotate from the open position to the closed position to close the electronic device with the cover covering the body.

\* \* \* \* \*

UNITED STATES PATENT AND TRADEMARK OFFICE
CERTIFICATE OF CORRECTION

PATENT NO. : 9,001,500 B2  
APPLICATION NO. : 13/631886  
DATED : April 7, 2015  
INVENTOR(S) : Zhou Chen Page 1 of 1

It is certified that error appears in the above-identified patent and that said Letters Patent is hereby corrected as shown below:

ON THE TITLE PAGE

Item (73) regarding "Assignees" on the front page of the Patent should read:

(73) Assignees: Fu Tai Hua Industry (Shenzhen) Co., Ltd., Shenzhen (CN);
Hon Hai Precision Industry Co., Ltd., New Taipei (TW).

Signed and Sealed this
First Day of December, 2015

Michelle K. Lee
*Director of the United States Patent and Trademark Office*